March 6, 1973  S. F. RADTKE ET AL  3,719,551
PROCESS FOR PRODUCING A LEAD-PLASTIC LAMINATE AND A
LAMINATE PRODUCED BY THE PROCESS
Filed Nov. 3, 1970  2 Sheets-Sheet 1

INVENTORS
SCHRADE F. RADTKE
JERRY MIRON,
PRADIP BHATT,
BHARAT C. SHAH &
IRVING SKEIST

Their ATTORNEYS

3,719,551
Patented Mar. 6, 1973

3,719,551
PROCESS FOR PRODUCING A LEAD-PLASTIC LAMINATE AND A LAMINATE PRODUCED BY THE PROCESS
Schrade F. Radtke, New Canaan, Conn., and Jerry Miron, Livingston, Pradip Bhatt, Newark, Bharat C. Shah, Hoboken, and Irving Skeist, Summit, N.J., assignors to International Lead Zinc Research Organization, Inc., New York, N.Y.
Filed Nov. 3, 1970, Ser. No. 86,519
Int. Cl. B21b *1/27;* B32b *15/08*
U.S. Cl. 161—213                              18 Claims

ABSTRACT OF THE DISCLOSURE

A process for producing a laminate, comprising a lead foil arranged between two sheets of a thermoplastic polymer, and a laminate produced by the process. The process includes the step of rolling the otherwise finished laminate in a two-roll mill to reduce its total thickness. This rolling step, which is preferably carried out in a direction perpendicular to the sheet plastic stress lines, substantially improves the extensibility of the laminate.

BACKGROUND OF THE INVENTION

The present invention relates to a process of making a lead-plastic laminate and, more specifically, to a method of imparting increased extensibility to a laminate comprising a lead foil arranged between two sheets of a thermoplastic polymer.

There are a number of metal-plastic laminates or plastic coated metals known in the art which may be used as packaging materials or for forming or molding containers. Such materials are described, for example, in the U.S. Pat. No. 2,394,816 to Frank J. Soday. One of these laminates which has proven especially suitable for forming and molding containers and other products is a composite comprised of a thin lead foil sandwiched between two sheets of a ductile plastic. This lead-plastic laminate exhibits the property of "superplasticity"; that is, it is possible to draw or deform the laminate by an amount in excess of one and one-half times its original length without cracking or breaking the lead foil.

The purpose of the lead foil in lead-plastic laminates is to lend strength to the laminate and to render the laminate impervious to vapors or liquids. If the laminate is used to form a storage can or tank for gasoline, for example, the lead foil prevents the escape of noxious hydrocarbon vapors. If the laminate is employed as a packaging material, the lead foil prevents the peneration of environmental water from the outside to the inside of the package. This latter advantage is particularly important in military packaging applications, where ammunition or electronic equipment intended for storage and use in tropical or sub-tropical climates may be damaged by moisture.

As noted above, one of the desirable features of a lead-plastic laminate is its relatively high extensibility. In fact, it has been observed that when lead foil is sandwiched between two layers of a ductile plastic such as high density polyethylene, the extensibility of the composite is much larger than that of the lead foil alone. This extensibility is a result of the mechanical support given the lead by the plastic backing.

Various attempts have been made to increase the extensibility of a lead-plastic laminate. In addition to varying the types of ductile plastic and varying the adhesive used to bond the plastic to the lead foil, research has been conducted to optimize such conditions as the bonding temperature and pressure, the temperature of forming, the plastic-to-lead thickness ratio and the like.

However, in this previous work the greatest extensibility obtainable has been linear elongation of 150 percent. Although adequate for some purposes and clearly superior to the elongation obtainable with any metal alone, this extensibility is considerably less than the maximum which can be expected from a ductile plastic alone. Consequently, there are many applications for which a plastic material may be used which would normally be without the reach of a laminate of lead and plastic.

SUMMARY OF THE INVENTION

It is therefore an object of the present invention to provide a lead-plastic laminate which exhibits an extensibility that is greater than that of any such laminate heretofore known in the art.

More particularly, it is an object of the present invention to provide a laminate, comprising a lead foil arranged between two sheets of a thermoplastic polymer, which exhibits an extensibility that approaches the extensibility of the plastic alone.

This object, as well as other objects which will become apparent in the discussion that follows, is achieved, according to the present invention, by passing an otherwise finished lead-plastic laminate between the rolls of a two-roll mill to reduce its thickness. By means of this simple technique it is possible to achieve a dramatic increase in the extensibility of the laminate. For example, if a laminate of lead and high density polyethylene is rolled in the proper direction and its thickness reduced by the proper degree, it is possible to elongate the laminate by as much as 700 percent before failure. This 700 percent elongation is the maximum which can be expected from polyethylene alone, so that the rolled laminate exhibits the ultimate extensibility that can be expected from the composite.

It has been found that the extensibility of a lead-plastic laminate is significantly different if the specimen is rolled in the direction of the extrusion of the plastic or in a direction perpendicular to the extrusion. With perpendicular rolling it is possible to reach the above-mentioned maximum value of 700 percent elongation, whereas with parallel rolling significantly lower extensions (up to 350 percent elongation) are obtained. This difference is probably due to changes in the crystallinity of the plastic sheet in the case of polyethylene. Upon extrusion, the polymer becomes anisotropic and therefore more crystalline. Rolling in a direction perpendicular to extrusion destroys the crystallinity and restores the amorphous character of the plastic, while rolling in the same direction as the extrusion line magnifies the anisotropic effect.

It is also noted that the increase in extensibility imparted by the rolling method according to the present invention depends, to a great extent, upon the degree to which the thickness of the laminate is reduced. For example, it has been found that a laminate of lead and high density polyethylene with a total initial thickness of 50 mils gives the best extensions when reduced in thickness to approximately 30 mils. When low density polyethylene is used in a laminate, the maximum extensions are achieved with an initial total thickness of 90 mils and a final thickness, reduced by rolling, of 50 mils. In general, it has been found that a reduction in thickness in the range of 40 to 80 percent gives the best results.

The success of the rolling method according to the present invention also largely depends upon the materials used in the lead-plastic laminate. The greatest extensibility may be obtained with high density or low density polyethylene. Although significant improvements may be achieved by rolling, the results achievable with other thermoplastic polymers are not as good. In the case of polypropylene, the maximum elongations obtained were 350 percent. With polyamides (nylon) and polyesters (polyethylene terephthalate or "Mylar"), the results ranged up to 100 percent. Composites of polyamide-lead-polyethylene exhibited a greater superplasticity than those of polyamide-lead-polyamide. However, the results were not as good as those achieved with high density polyethylene alone.

A complete list of the thermoplastic polymers which are usable in the lead-plastic laminate that is subjected to the rolling method according to the present invention is given below in the detailed description of the invention.

DETAILED DESCRIPTION OF THE INVENTION

Figure 1:
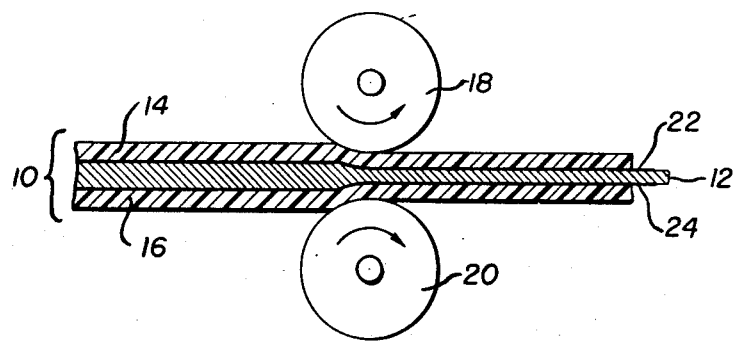
FIG. 1 is a representational diagram, not drawn to scale, of the laminate rolling method according to the present invention.

The present invention will now be described in connection with FIGS. 1–4 of the drawings. FIG. 1 shows typical apparatus for carrying out the method of rolling a lead-plastic laminate according to the present invention. A laminate 10 comprising a lead foil 12 arranged between two sheets 14 and 16 of a ductile plastic is passed between the rollers 18 and 20 of a two-roll mill. The spacing between the rollers 18 and 20 is adjusted so that the thickness of the laminate 10 will be reduced by a prescribed amount. The rollers 18 and 20 are rotated in the direction indicated by the arrows by a suitable drive mechanism (not shown) connected to either one or both of the rollers. Connection of the drive mechanism to both of the rollers is preferred since, in this case, the laminate will exhibit less tendency to slip with respect to the rollers when it is first inserted.

Although it is possible in some cases to thermally bond the plastic sheets 14 and 16 to the lead foil 12, it is preferable to use an adhesive 22, 24 between the respective layers. A process of bonding with a particular adhesive will be described in detail below.

Although the laminate may be compressed to its desired final thickness in a single pass through the rollers 18 and 20, it is preferable if the laminate is rolled several times and reduced in thickness each time by 10 to 12 percent. Thus, limiting the reduction in thickness during each pass through the rollers will prevent the biuldup of heat which may be detrimental to the composite.

Figure 2:
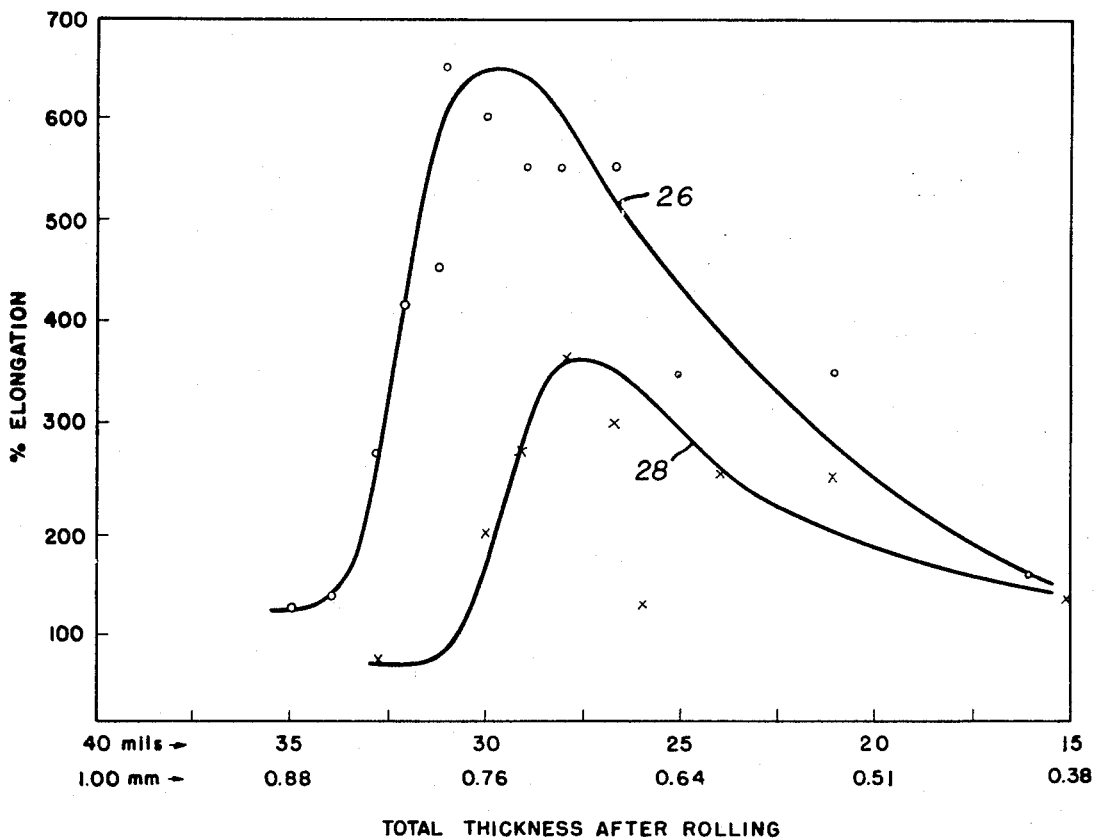
FIG. 2 is a graph showing percent elongation of a laminate in dependence upon its total thickness after rolling. This diagram shows the effect of rolling a laminate of lead and high density polyethylene in directions both perpendicular to and parallel to the stress lines of the plastic.

FIG. 2 illustrates the effect on extensibility of rolling a laminate of lead and high density polyethylene. The original thickness of the two plastic sheets was 20 mils or 0.5 millimeters. The original thickness of the lead foil was 10 mils or 0.25 millimeters. The total original thickness was therefore 50 mils (20+10+20) or 1.25 millimeters.

When the laminate was rolled in a direction perpendicular to the stress lines of the high density polyethylene, subsequent destructive testing of the extensibility of the laminate yielded the results indicated on the graph by the small circles. When the laminate was rolled in a direction parallel to the stress lines of the high density polyethylene, the extensibility tests produced the results indicated on the graph by the small crosses.

As shown by the curve 26 the laminate rolled perpendicular to the stress lines could be elongated up to 650 percent without failure when its thickness was reduced to 30 mils or 0.76 millimeters. As shown by the curve 28, the laminate rolled parallel to the stress lines could be elongated up to 350 percent without failure when its thickness was reduced to 28 mils or 0.72 millimeters.

Figure 3:
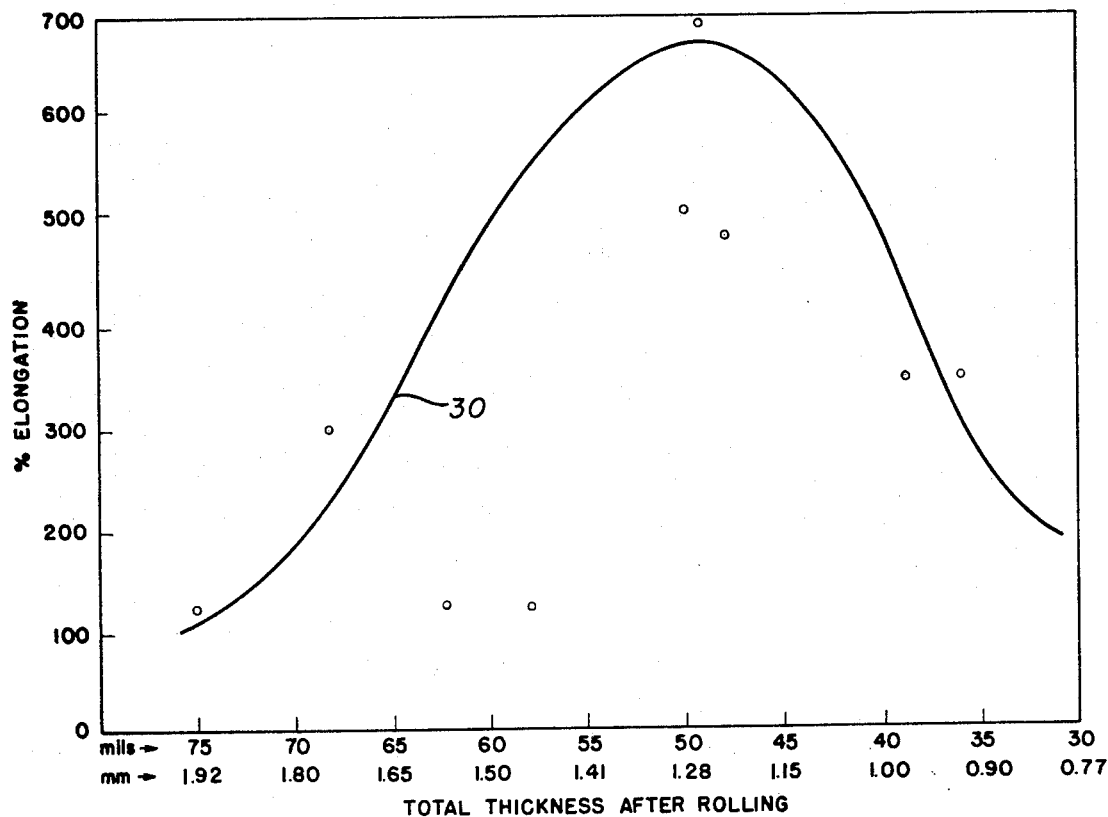
FIG. 3 is a graph showing percent elongation of a laminate in dependence upon its total thickness after rolling. This diagram shows the effect of rolling a laminate of lead and low density polyethylene in a direction perpendicular to the stress lines of the plastic.

FIG. 3 illustrates the increase in extensibility obtainable by rolling a laminate of lead and low density polyethylene in a direction perpendicular to the stress lines of the plastic. The original thickness of the low density polyethylene sheet was 40 mils or 1.02 millimeters. The original thickness of the lead foil was again 10 mils or 0.25 millimeters.

As shown by the curve 30, it was possible to elongate this laminate, after rolling, by as much as 700 percent when its total thickness after rolling was reduced to 50 mils or 1.28 millimeters. In the case of low density polyethylene it has been observed that the plastic sometimes breaks before the lead foil when the laminate is being elongated. These breaks are due to the fact that the low density polyethylene is soft and rubbery.

Figure 4:
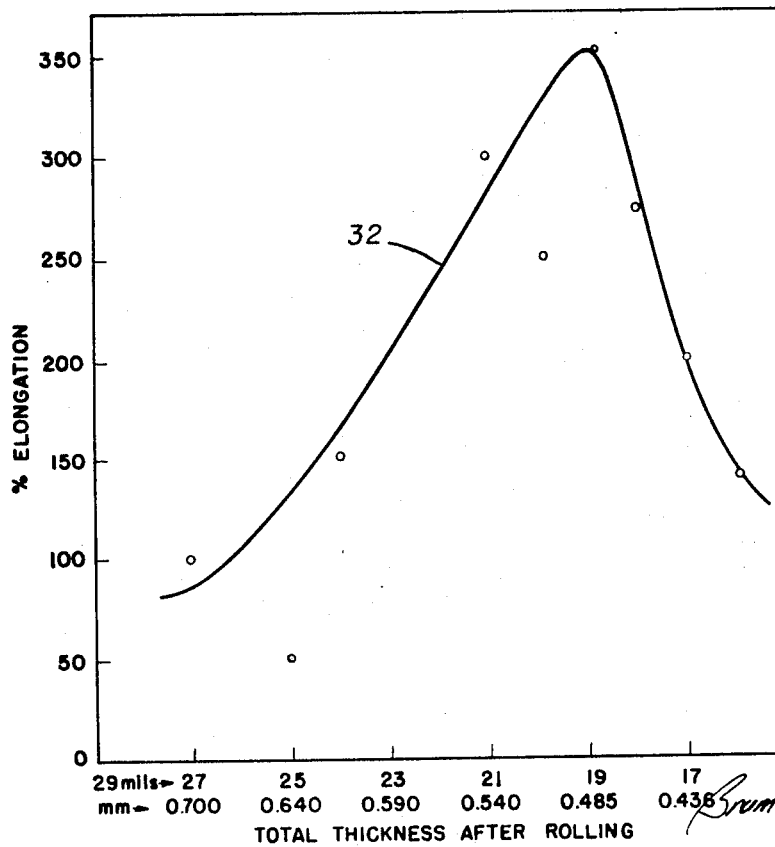
FIG. 4 is a graph showing percent elongation of a laminate in dependence upon its total thickness after rolling. This diagram shows the effect of rolling a laminate of lead and polypropylene in a direction perpendicular to the stress lines of the plastic.

FIG. 4 shows the effect of rolling a laminate of lead and polypropylene. In this case the original thickness of each plastic sheet as well as the lead foil was 10 mils or 0.25 millimieters. As shown by the curve 32, the maximum elongation achieved was 350 percent when the total thickness of the laminate was reduced by rolling to 19 mils or 0.485 millimeters. The test results forming curve 32 were not correlated with the stress line direction in which the laminate was rolled.

From the graphs of FIGS. 2–4 it is apparent that the extensibility of a lead-plastic laminate increases with increasing thickness reduction until it reaches a maximum. This maximum occurs when the thickness has been reduced to approximately 60 percent of the original thickness. Thereafter, a further reduction in the thickness of the laminate weakens the laminate and lowers its extensibility. As may be seen, a reduction in thickness anywhere in the range of 40 to 80 percent of the original thickness produces an effective increase in extensibility.

Extensibility tests of a lead-polyamide laminate having an original polyamide (nylon 6,6) thickness of 22 mils or 0.5 millimeters and an original lead thickness of 10 mils or 0.25 millimeters showed a maximum of 100 percent elongation after rolling when the total thickness was reduced to about 25 mils or 0.64 millimeters. The elongation obtainable with polyamides is therefore much lower than that obtainable with high density or low density polyethylene or with polypropylene.

Experiments were conducted using a laminate consisting of a polyamide (nylon 6,6), lead and high density polyethylene. In this case the original thickness of the polyamide layer was 25 mils or 0.64 millimeters while the original thickness of the high density polyethylene sheet was 40 mils or 1.02 millimeters. The original thickness of the lead foil was again 10 mils or 0.25 millimeters. Upon rolling, it was possible to elongate the laminate by as much as 175 percent after the total thickness was reduced to 44 mils or 1.13 millimeters. From these experiments, it can be concluded that the polyamide-lead-high density polyethylene laminate gives better results when subjected to the rolling method according to the present invention than the laminate comprised solely of a polyamide and lead. Tests with these lead-polyamide laminates have shown that the polyamide sheet may break before a crack occurs in the lead foil.

Experiments have also been conducted with a laminate of lead and polyethylene terephthalate ("Mylar"). The original thickness of the two polyethylene terephthalate sheets in this laminate was 3 mils or 0.077 millimeters.

The original thickness of the lead foil was again 10 mils or 0.25 millimeters. The test results showed that the extensibility of a lead-polyethylene terphthalate laminate is rather limited. The maximum elongation achieved with this laminate was 100 percent at a total final thickness of 13 mils or 0.33 millimeters.

The formation of a lead-plastic laminate for use with the rolling method according to the present invention will now be described. When considering the laminate, it is necessary only to consider the type, thickness and treatment of the plastic sheet, the lead foil and the adhesive.

The plastic sheet employed with the laminate may consist of any thermoplastic polymer; that is, any plastic which softens and solidifies without substantial change in its physical properties. The important features of the plastic, for the purposes of the laminate, are its ductility within the range of temperatures in which the laminate will be used and its resistance to the environment (e.g., gasoline) to which the laminate will be subjected. If different temperatures or environments are expected on opposite sides of the laminate, the plastic sheets of these opposite sides may consist of different polymers.

Any of the following plastics may therefore be suitable for use in the laminate according to the present invention:

Polyolefins:
    polyethylene (high and low density)
    polypropylene
    polybutene (polybutylene)
Vinyl polymers:
    polyvinylchloride and copolymers
    polyvinylidenechloride
    polystyrene and copolymers
    poly(co-acrylonitrile-butadiene-styrene) (ABS)
Acrylic polymers: polymethylmethacrylate and copolymers
Polyesters: polyethylene terephthalate (Mylar)
Polyamides:
    poly(hexamethyleneadipamide) (nylon 6,6)
    poly ($\Sigma$-caprolactam) (nylon 6)
Polyacetals: polyoxymethylene and copolymers
Cellulose esters: cellulose acetate The plastic sheet formed from the above polymers should have a thicknesss which is comparable to or greater than the thickness of the lead foil to provide the proper support for the lead foil. There is actually no upper limit to the thickness of the plastic; however, cold-forming of the laminate is made more difficult as the thickness is increased. A thickness for each plastic sheet in the laminate should therefore preferably lie in the range of 1 to 10 times the thickness of the lead foil. The two plastic sheets in a single laminate may, of course, have different thicknesses.

It is possible to increase the strength of the plastic sheet in the manner well known in the art by providing a reinforcing filler. Although the use of filler may reduce the extensibility somewhat, filler reinforced thermoplastics exhibit improved impact resistance and are easier to cold-form. The filler material may be either the fibrous or non-fibrous type. The material may also be polymeric or non-polymeric, depending upon the desired properties of the reinforced sheet. Typical of the polymeric materials which may be used as synthetic fiber and nylon fiber. Typical of the non-polymeric materials are glass, asbestos, sisal and jute fiber.

The lead foil employed with the laminate should consist essentially of lead but preferably also contains alloying metals which stabilize the surface and increase the hardness of the foil. Lead is used in preference to other metals due to its low elastic modulus which imparts an ability to "creep" or move under stress.

The lead is preferably alloyed with tin which prevents corrosion or oxidation of the lead surface and lubricates the surface so that the lead will not stick to the rolls when the lead foil is produced. The tin content of the alloy may range from traces (0.005 percent) up to 15 percent.

The lead is also preferably alloyed with a small amount of antimony. Antimony slightly increases the elastic modulus of the lead and thus prevents tearing of the foil. A lead foil containing 0.1 percent tin and 0.07 percent antimony has proven particularly satisfactory as laminate material.

The thickness of the lead foil used to form the laminate is preferably about 10 mils or 0.25 millimeters. If the foil is made thinner, the lead may pinhole or break prematurely when forming and rolling the laminate. If the foil is made thicker the laminate will be made unnecessarily heavy and more expensive.

The adhesive employed to cement the plastic sheets to the lead foil should be flexible and resistant both to water and gasoline (oil). Epoxy adhesives are good for this purpose; however, they are expensive and may not be sufficiently flexible. Nitrile rubber based adhesives are more flexible and are therefore preferred.

A nitrile rubber adhesive which has proven satisfactory for the laminate according to the present invention is "Pliobond 30," a product of Goodyear. Pliobond 30 is a solution of nitrile rubber modified with a phenolic resin. Although nitrile phenolics are particularly well known for bonding metal to metal and metal to non-metallic substances, any other adhesive which is sufficiently flexible and produces an effective water and oil resistant bond may also be used. For a discussion of adhesives, see H. E. Howe and S. F. Radtke, "How to Join Lead with Adhesives," Adhesives Age (September 1968, and I. Skeist, Handbook of Adhesives, Reinhold Publishing Corporation, New York (1962).

The formation of the laminate will now be described with reference to specific examples:

Example 1

The surfaces of two high density or low density polyethylene sheets are oxidized by immersing the sheets for ten minutes at 180° F. (82° C.) in a hot solution consisting of:

| | Parts by weight |
|---|---|
| Concentrated sulphuric acid | 150 |
| Distilled water | 12 |
| Potassium dichromate | 7.5 |

The sheets are subsequently flushed with distilled water and air dried.

The surface of a lead foil is cleaned with trichloroethylene to remove all oil or grease prior to application of the adhesive. The adhesive, Pliobond 30, is diluted in a 1:1 ratio with methyl ethyl ketone to improve its spreading properties. The surfaces of both the plastic sheets and the lead foil are then coated with the adhesive and dried overnight to produce a uniform 1 mil (0.025 millimeters) dry adhesive film on each. When the surfaces are mated, the total thickness of adhesive will be 2 mils (0.05 millimeters).

The three laminate layers are finally pressed together for fifteen minutes at a temperature of 260° F. When the laminate is complete, it is passed several times at room temperature through a two-roll mill and thereby subjected to great pressure to obtain the desired reduction in total thickness.

Example 2

The surfaces of two polypropylene sheets are oxidized in the same manner as described above. The lead foil is degreased, the adhesive applied and allowed to dry. In this case, the lead and plastic layers are pressed together for six minutes at a temperature of 280° F. to form the bond.

Example 3

Adhesive is directly applied to two polyamide sheets and to the cleaned surfaces of lead foil and allowed to dry. The three layers are pressed together for six minutes at a temperature of 280° F.

It is possible to form the laminate without the use of an adhesive by creating a thermal bond between the plastic sheets and the lead foil. Although the use of an adhesive is preferred, a thermal bond may be sufficiently strong for the purposes of the laminate depending upon the intended use and environment of the laminate.

The determination of extensibility of the laminates which were subjected to the rolling method according to the present invention was made by separating the ends of a sample strip with a crosshead speed of 7.5 inches (19 centimeters) per minute either at room temperature or at an elevated temperature. The sample strips of laminate were 1 inch (2.5 centimeters) wide and 6 inches (15 centimeters) long. The percent elongation in the longitudinal direction of the strip was measured before the lead foil cracked, as observed with an infrared lamp. Since the width of the sample was decreased as the sample elongated, the area extensibility of the sample was normally approximately half the value of its linear extensibility.

It will be understood that the present invention is susceptible to various changes, modifications and adaptations as will occur to those skilled in the art. It is therefore intended that the scope of the present invention be limited only by the following claims.

We claim:
1. A laminate comprising a foil made substantially of lead arranged between two sheets of a thermoplastic polymer, said sheets of thermoplastic polymer having stress lines generated by the extrusion of said sheets, said stress line being arranged in a common direction, said laminate being rolled, after bonding, in a direction perpendicular to the stress lines thereby improving the extensibility of the laminate comprised of said two sheets of plastic and said foil.

2. In a process for producing a laminate comprising a foil made substantially of lead arranged between two sheets of a thermoplastic polymer, said sheets of polymer having stress lines generated by the extrusion of said sheets, the improvement comprising arranging said two sheets of plastic so that the stress lines in each of said two sheets are in a common direction, and rolling said laminate in a direction perpendicular to said stress lines.

3. The improvement defined in claim 2, wherein said laminate is rolled at room temperature.

4. The improvement defined in claim 2, wherein said foil is made of a lead alloy containing between 0.005 and 15 percent tin.

5. The improvement defined in claim 2, wherein said foil is made of a lead alloy containing between 0.005 and 0.1 percent antimony.

6. The improvement defined in claim 2, wherein said foil is made of a lead alloy containing approximately 0.1 percent tin and 0.07 percent antimony.

7. The improvement defined in claim 2, wherein said sheets are made of a thermoplastic polymer selected from the group consisting of polyolefins, vinyl polymers, acrylic polymers, polyesters, polyamides, polyacetals and cellulose esters.

8. The improvement defined in claim 2, wherein said sheets are made of a polyolefin selected from the group consisting of polyethylene, polypropylene and polybutene.

9. The improvement defined in claim 8, wherein said sheets are made of high density polyethylene.

10. The improvement defined in claim 2, wherein said thermoplastic polymer is filled with at least one foreign substance to impart desired mechanical properties thereto.

11. The improvement defined in claim 10, wherein the thermoplastic polymer filler is in the form of fiber.

12. The improvement defined in claim 10, wherein said foreign substance is selected from the group consisting of glass, asbestos, sisal and jute.

13. The improvement defined in claim 2, wherein said two sheets are joined to said foil by means of an adhesive.

14. The improvement defined in claim 13, wherein said adhesive is a nitrile rubber adhesive.

15. The improvement defined in claim 2, wherein the thickness of said laminate is decreased to 40 to 80 percent of its thickness before rolling.

16. The improvement defined in claim 2, wherein said foil has a thickness of approximately 10 mils before rolling.

17. The improvement defined in claim 2, wherein said sheets each have a thickness before rolling in the range of one to ten times the thickness of said foil.

18. The improvement defined in claim 17, wherein said sheets each have a thickness before rolling in the range of 10 to 40 mils.

References Cited

UNITED STATES PATENTS

| | | | |
|---|---|---|---|
| 2,286,759 | 6/1942 | Patnode | 72—366 X |
| 3,505,159 | 4/1970 | Winter | 161—216 X |
| 3,607,614 | 9/1971 | MacKay et al. | 161—216 X |
| 3,274,679 | 9/1966 | Kennedy | 29—527.2 X |
| 3,359,096 | 12/1967 | Jost | 29—527.2 X |
| 3,600,268 | 8/1971 | Horn et al. | 161—216 X |

ROBERT F. BURNETT, Primary Examiner

J. C. GIL, Assistant Examiner

U.S. Cl. X.R.

29—527.2; 72—365; 156—199, 244, 331; 161—214, 216, 218, 220